United States Patent
Hanley

[11] Patent Number: 5,806,925
[45] Date of Patent: Sep. 15, 1998

[54] BREATHABLE PROTECTIVE SEAT COVER

[76] Inventor: Mark G. Hanley, 747 Fieldale La., Grayslake, Ill. 60030

[21] Appl. No.: 647,690
[22] Filed: May 13, 1996
[51] Int. Cl.[6] .................................................. A47C 31/00
[52] U.S. Cl. ................ 297/229; 297/219.1; 297/228.1; 297/228.11
[58] Field of Search ................. 297/229, 219.1, 297/219.12, 228.1, 228.11

[56] References Cited

U.S. PATENT DOCUMENTS

| | | | |
|---|---|---|---|
| 2,017,178 | 10/1935 | Braukhof | 155/182 |
| 2,161,448 | 6/1939 | Bishop | 297/228.11 |
| 2,490,451 | 12/1949 | Magid | 154/117 |
| 3,003,816 | 10/1961 | Wilson | 297/228.11 |
| 3,371,957 | 3/1968 | Cook | 297/219 |
| 3,916,447 | 11/1975 | Thompson | 297/220 X |
| 4,378,396 | 3/1983 | Urai et al. | 428/198 |
| 4,676,376 | 6/1987 | Keiswetter | 297/219.1 |
| 4,828,320 | 5/1989 | Saiger | 297/229 |
| 4,840,841 | 6/1989 | Madsen | 297/229 X |
| 4,884,839 | 12/1989 | Keiswetter | 297/229 |
| 4,887,865 | 12/1989 | Dawidzon | 297/229 X |
| 4,891,454 | 1/1990 | Perdelwitz, Jr. et al. | 297/229 X |
| 4,943,105 | 7/1990 | Kacar et al. | 297/229 X |
| 5,005,901 | 4/1991 | Hinde | 297/229 |
| 5,150,945 | 9/1992 | Aupperlee et al. | 297/229 X |
| 5,150,947 | 9/1992 | Croshaw | 297/229 |
| 5,294,166 | 3/1994 | Shapland | 297/229 X |
| 5,320,407 | 6/1994 | Tell | 297/229 X |
| 5,333,921 | 8/1994 | Dinsmoor, III | 297/219.1 |
| 5,474,329 | 12/1995 | Wade et al. | 292/228.11 X |
| 5,529,373 | 6/1996 | Olson et al. | 297/228.11 X |

Primary Examiner—Peter M. Cuomo
Assistant Examiner—Rodney B. White
Attorney, Agent, or Firm—Marshall, O'Toole, Gerstein, Murray & Borun

[57] ABSTRACT

A breathable and washable protective seat cover for automobile seats or the like which comprises a multi-layer construction that has been configured to form a pocket at one end that fits over the upper end of the seat and an elongated section that loosely covers the front surfaces of the seat. Layers comprise an absorbent upper layer and a vapor permeable liquid-blocking lower layer. The upper layer wicks moisture away from the occupant and readily releases it through evaporation, the lower layer provides a breathable property while blocking liquid water, sweat, mud, and the like; thereby protecting the underlying upholstery and providing a comfortable seating surface. The seat cover materials and loose fitting geometry facilitates and withstands frequent installation-removal-laundering cycles. The lower polymeric membrane layer additionally provides a rubbery texture that grips the car seat upholstery to prevent movement or bunching of the seat cover when an individual enters the seat. Also, an integral drawcord and toggle closure provides a self-storing mechanism which simplifies packing and transport of the seat cover between uses.

8 Claims, 3 Drawing Sheets

BREATHABLE PROTECTIVE SEAT COVER

BACKGROUND OF THE INVENTION

This invention relates to car seat covers; specifically to such user installed covers that function as protective coverings over a car seat's primary upholstery.

People active in outdoor activities such as mountain biking, hiking, rollerblading, running, water sports, and snow sports, must often use their car to travel to parks and other outdoor recreation areas. Such outdoor areas frequently do not provide facilities for showering or changing clothing. Thus, unless some temporary protective covering is applied to the car seat prior to the drive home, any accumulated sweat, dirt, dust, water, snow, or mud will be passed to the car seat's upholstery.

Such active individuals, interested in preserving their valuable upholstery, often use bath towels, T-shirts, Sweatshirts, and other various types of clothing to fashion a temporary, make-shift seat cover that can be easily removed and washed along with their workout apparel when they arrive home. Such make-shift seat covers are lacking in several respects. Namely, they are time consuming and difficult to install due to the awkward shapes of the apparel used with respect to the car seat. In particular, the seat back is especially difficult in this respect since no simple method of firmly anchoring apparel to it is available. Additionally, this inconsistency between apparel geometry and seat geometry often results in incomplete coverage of the seat's upholstery. Furthermore, it is difficult to enter the seat without disturbing the arrangement and inadvertently exposing the seat's upholstery. Finally, these make-shift seat covers are not waterproof, and will transmit moisture and suspended dirt particles to the underlying seat upholstery.

Commercially available car seat covers are commonly designed for semi-permanent installation, and to closely conform with the dimensions of a particular seat. For example, some designs utilize a multi-piece approach where separate coverings for the seat bottom, back, and headrest have been specifically dimensioned to fit a particular make and model of car seat. Integral fasteners such as zippers, elastic straps, and drawcords are typically used to secure these pieces to the seat. Such designs can be constructed using a variety of materials to achieve a desired aesthetic quality, comfort quality, durability, or protective quality. For example, lamb's wool is often used to provide excellent aesthetics and comfort, Denim may be used to provide durability, and vinyl coated canvas may be used for protection from water, dirt, and mud. Such multi-piece seat covers are inherently high in cost, time consuming to install and remove, cannot be transferred for use in a different car, and are difficult or impossible to clean using conventional household laundering methods.

Simplified seat cover designs employing two-piece or one-piece configurations are also commonly available. However, all of these designs utilize fastening schemes or mechanisms that substantially increase installation and removal time. In addition, they are generally not easily transferred from one car to another, and often present the laundering difficulties indicated above.

Finally, all of the commercially available seat covers are deficient with respect to solving the primary problem outlined above. Specifically, these products have not been designed to satisfy the needs of active individuals who desire an easy to use, aesthetically pleasing, protective car seat cover that has been designed and fabricated to facilitate and withstand frequent installation-removal-laundering cycles. Additionally, none of these commercially available seat covers are capable of providing a breathable or comfortable seating surface that adequately protects the underlying upholstery from sweat, water, dirt, mud, and other contaminants typically accumulated during the outdoor activities indicated above.

Temporary use protective car seat covers have been proposed in the past. For example, U.S. Pat. Nos. 4,676,376 (1987) and 4,884,839 (1989) both to Keiswetter disclose disposable seat covers formed from two layers of plastic film. While these inventions provide protection to a car seat, they do not provide a breathable characteristic, or any reasonable degree of comfort, and cannot be laundered or used multiple times. Furthermore, seat covers formed from such plastic films are highly undesirable from an aesthetics standpoint.

U.S. Pat. No. 3,371,957 to Cook (1968) shows a car seat cover having a textile outer surface to which a plastic foam backing has been selectively adhesively bonded. Cook's seat cover has been designed for semi-permanent, or permanent installations, and would require a substantial amount of time to install and remove. The preferred embodiment depicts a configuration that in some cases would require complete removal of the car seat from the vehicle to allow installation. Also, the foam backing and adhesives used in Cook's seat cover would not be compatible with conventional washing and tumble drying operations. Finally, the materials specified for Cook's cover would not provide adequate protection from sweat, mud, water, and the like.

SUMMARY OF THE INVENTION

The invention is directed to a protective cover for a seat, such as a car seat, having a seat portion and a back portion. The protective cover has an upper layer of material, composed of a liquid-absorbent material, having a seat portion on which a person's legs may be supported and a back portion against which a person's back may be disposed. The protective cover has a lower layer of material, composed of a liquid-impermeable material, which is associated with the upper layer of material. The lower layer of material has a seat portion adapted to conform to the seat portion of the seat and a back portion adapted to conform to the back portion of the seat.

The upper layer of material may be composed of a nylon mesh material, a polyester fleece material, terry cloth, or similar materials which are substantially liquid-absorbent. The lower layer of material may be composed of polyurethane or other materials which are substantially liquid-impermeable and gas-permeable and may be provided with a lower surface having a rubbery texture for gripping the car seat. The protective cover may also be provided with a middle layer, disposed between the upper and lower layers.

The protective cover may be provided with a pocket, attached to one of the layers of material, which is adapted to fit over a top portion of the seat. The pocket is sized to allow the upper, middle and lower layers to be removably disposed therein, and the pocket is provided with closure means, such as a drawstring, for closing the pocket when the upper, middle and lower layers are disposed therein.

Accordingly, several objects and advantages of the present invention are:

(a) to provide a car seat cover that will be considered a highly desirable and functional accessory for any outdoor sports activity.

(b) to provide a car seat cover that more specifically meets the functional and aesthetic expectations of individuals who participate in outdoor sports.

(c) to provide a waterproof and breathable car seat cover that will adequately protect the upholstery surface from liquid water, sweat, dirt, mud and other contaminants without compromising comfort.

(d) to provide a car seat cover that will quickly wick, absorb, or draw moisture away from the users body, and allow it to quickly evaporate to maximize comfort.

(e) to provide a substantially simplified, low-cost, lightweight, car seat cover that can be quickly installed and removed from a car seat without the use of auxiliary or integral fastening devices such as elastic bands, hooks, clamps, or zippers.

(f) to provide a car seat cover that can withstand frequent installation-removal-laundering cycles.

(g) to provide a car seat cover that can be cleaned using conventional household laundering methods.

(h) to provide a loose fitting seat cover that will fit a majority of car seats; thereby allowing portability from one car to another.

(i) to provide a seat cover with a non-slip backing that will prevent undesirable movement and bunching of the seat cover when a user enters the seat.

Further objects and advantages of this invention will become apparent from a consideration of the drawings and ensuing description.

DETAILED DESCRIPTION OF A PREFERRED EMBODIMENT

Figure 1:
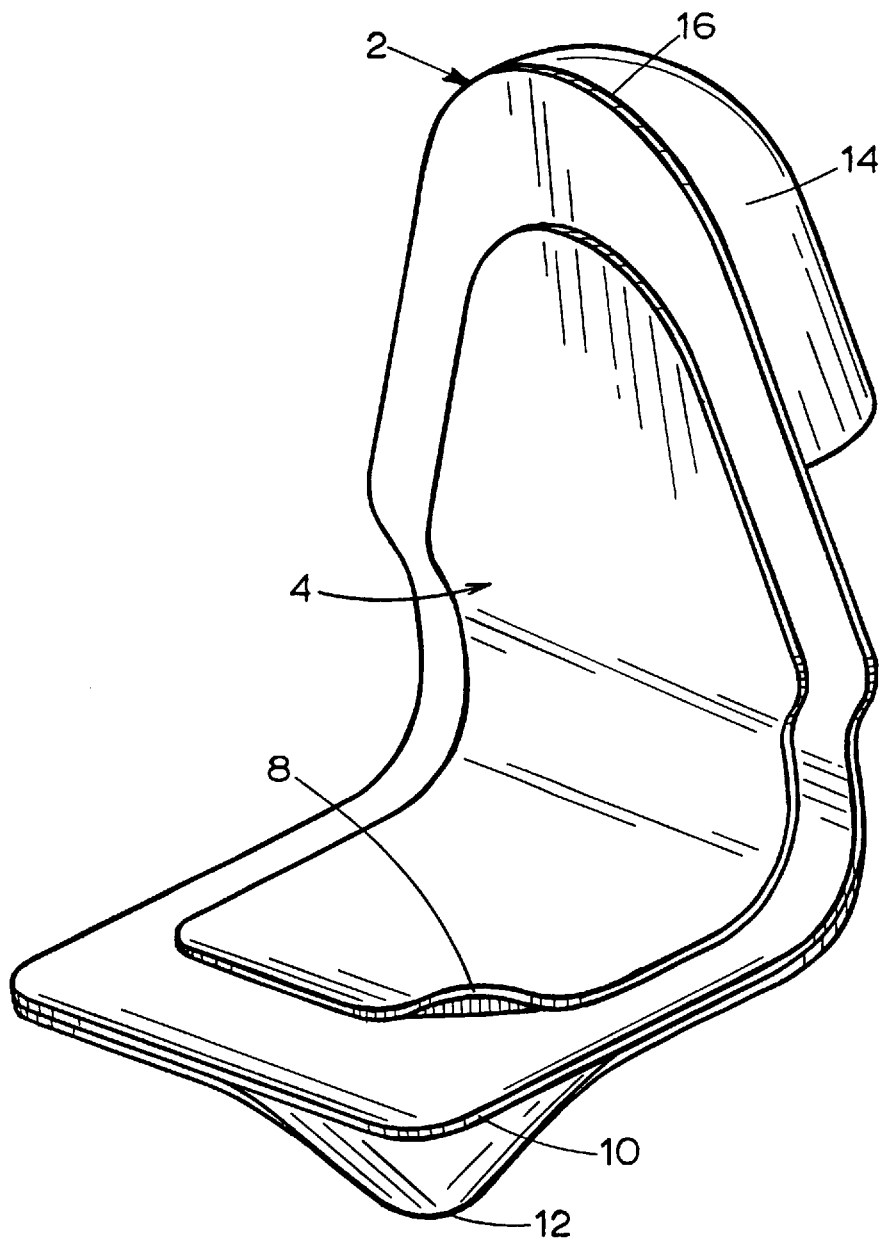
FIG. 1 is a perspective view of the present invention as it would appear conforming to a typical automobile seat.
Figure 2:
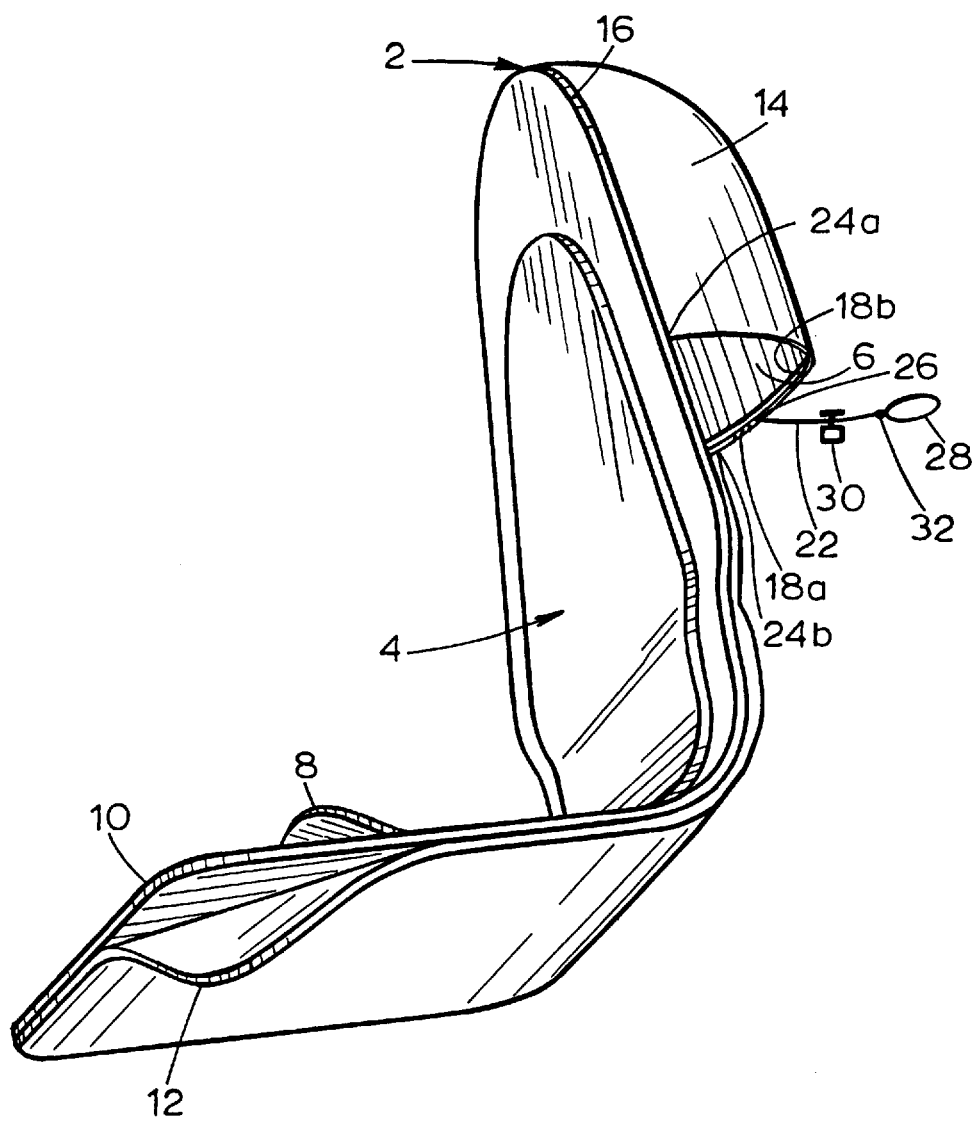
FIG. 2 is an alternate perspective view.

FIGS. 1 and 2 show perspective views of the car seat cover of the present invention. A seat cover 2 comprises a multi-layer fabric strip 4 having a pocket or cap 6 formed at an upper end. The geometry of fabric strip 4 is sufficiently long and wide to cover upholstery surfaces that would otherwise be in direct contact with the seat's occupant.

Multi-layer fabric strip 4 is comprised of an upper layer 8, a middle layer 10, and a lower layer 12. Upper layer 8 is a light-weight, machine washable, machine dryable material, and is preferably a synthetic fabric, such as nylon-Lycra mesh, that wicks or absorbs moisture, and facilitates rapid evaporation of accumulated moisture to maximize comfort for the seat's occupant. However, any material with equivalent or similar properties such as jersey, polyester fleece, and terry cloth may be substituted to achieve a similar result. Middle layer 10 is a light-weight, machine washable, machine dryable material that has been permanently attached or laminated to lower layer 12, and is desirably an aesthetically appealing, highly durable synthetic fabric such as nylon. Lower layer 12 is preferably a thin polyurethane gas permeable or breathable membrane that blocks liquids and other such larger particles, but which allows gases, including water vapor, to pass through. Such a membrane is commercially available from Enterprise Coatings, Co. LTD of Smithfield, R.I. Enterprise Coatings, Co. LTD also provides a service to bond such a polyurethane membrane to a variety of customer supplied textiles. The exposed face of middle layer 10 may be attractively colored, printed, embroidered, or the like to provide an aesthetically appealing design, while lower layer 12 serves to protect the car seat upholstery from contaminants, and additionally provides a breathable characteristic to maximize comfort. Furthermore, lower layer 12 has a rubbery texture which allows the seat cover to grip the surface of the seat to keep it in place when the user enters the vehicle.

Cap or pocket 6 formed at the upper end of the seat cover comprises a back panel 14 that has been permanently attached to the upper end of the seat cover along a curved edge 16. Back panel 14 is fabricated from a light-weight, machine washable, and machine dryable material. Desirably, a synthetic fabric such as nylon-Lycra mesh is used that additionally provides an elastic characteristic to allow the seat cover to more easily conform to a wide variety of seat back dimensions.

A pair of drawcord channels 18a and 18b are integrally formed along a lower edge of back panel 14 using a lip of material that has been folded towards, and fastened to the inside of cap or pocket 6. The ends of a drawcord 22 are securely anchored at 24a and 24b. The lengths of the drawcord extending from these ends are loosely captured by drawcord channels 18a and 18b. An opening 26 in the drawcord channel is centrally located on back panel 14. A loop 28 is formed by pulling the exposed drawcord through centrally located opening 26. The drawcord loop is passed through the opening of a spring-loaded toggle closure 30. A knot 32 in the drawcord loop permanently captures the toggle closure on the drawcord.

Middle layer 10 and lower layer 12 are pre-laminated together in sheets or rolls, and then cut to a pre-determined geometry. Upper layer 8 is then preferably sewn to a panel that has been cut from the pre-laminated middle layer material. Other methods of attaching the upper layer to the pre-laminated middle layer panel, such as Velcro, adhesives, buttons, snaps, or zippers may be used. The upper layer as shown in the preferred embodiment has been sized to cover only the primary seating surface with the objective of minimizing material cost. However, the geometry of the upper layer could be changed to cover more or less of the seating surface, or could be eliminated completely to further reduce costs. Back panel 14 is preferably sewn to the multi-layer fabric strip along curved edge 16. However, other methods of attachment such as Velcro, zippers, adhesives, or the like may be used with similar results.

Finishing of exposed edges on the complete seat cover is not required in the preferred embodiment since the specified materials will not ravel or fray with use. This serves to minimize manufactured cost. However, other embodiments may employ some alternative finish on raw edges to provide a more decorative or aesthetically pleasing effect.

Further embodiments may include an additional layer of material that in effect sandwiches lower layer 12 against the back side of middle layer 10. Such a layer may be added to protect lower layer 12 from abrasions and tears.

From the description above, a number of advantages of the present invention become evident:

(a) The lower layer polyurethane membrane will block the transfer of liquid water, sweat, dirt, mud, and the like to the underlying seat's upholstery. Additionally, the gas permeable or breathable property of the this membrane will serve to maximize comfort.

(b) The upper layer readily wicks or absorbs moisture, and readily releases it through evaporation to maximize comfort.

(c) The seat cover consists of a simple, low-cost, lightweight assembly that can be quickly and conveniently installed without the need for time consuming fasteners such as elastic bands, hooks, clamps, or zippers.

(d) The materials selected in the preferred embodiment described above can be washed and dried repeatedly using conventional household laundering methods and appliances.

(e) The seat cover has been sized and configured to fit a majority of car seats, and therefore can be used in multiple vehicles.

(f) The polyurethane membrane backing has a rubbery texture that provides a non-slip characteristic on all types of upholstery.

(g) The integral drawcord and toggle closure provides a self-storing mechanism that improves packability, and simplifies transport of the seat cover between uses.

(h) The materials specified allow for a wide range of colors and decorative prints to enhance aesthetics of the design.

(i) The above described invention more specifically meets functional expectations of individuals participating in sports activities, and thus, would be considered a highly desirable and functional accessory for any sport.

Installation of the seat cover is accomplished by slipping pocket 6 at the upper end of the seat cover over the seat's back. Then the seat cover's multi-layer fabric strip 4 is quickly arranged to cover the seat back and bottom. The rubbery texture of lower layer 12 will minimize any tendency for the seat cover to move or bunch when the user enters the seat. Any moisture present on the user's body that is in contact with the seat cover will be quickly wicked away by upper layer 8. Upper layer 8 has been chosen to provide this wicking property and additionally promotes rapid evaporation of any moisture that has been captured. Lower layer 12, however, will not allow any liquid moisture to penetrate through to the seat's upholstery. Removal of the seat cover is accomplished by simply lifting pocket 6 up and away from the seat back.

Figure 3:
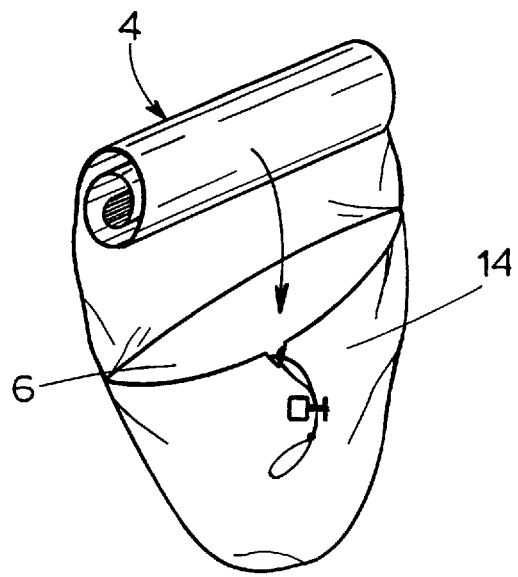
FIG. 3 is a view of the seat cover as it appears in a partially stored condition.
Figure 4:
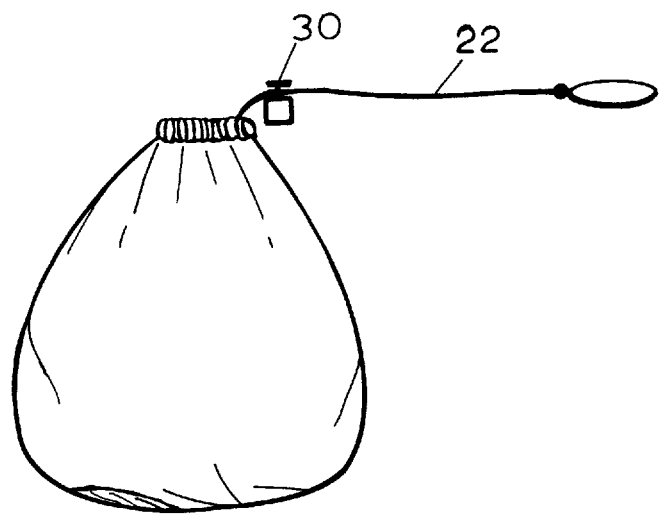
FIG. 4 is a view showing one possible fully stored condition.

Referring to FIGS. 3 and 4, the seat cover can be self stored by packing multi-layer fabric strip 4 into pocket 6 formed by back panel 14, and pulling drawcord 22 through toggle closure 30.

Accordingly, the reader will see that car seat cover of this invention provides an easy to use design that facilitates and withstands frequent installation-removal-laundering cycles. In addition, the proposed seat cover provides a comfortable seating surface while protecting the underlying car seat upholstery from sweat, mud, water, dirt, and other contaminants that are accumulated during any sporting activity. Thus, the proposed seat cover more specifically meets the functional expectations of individuals who participate in outdoor sports.

Although the description above contains many specificities, these should not be construed as limitations on the scope of the invention, but rather as an exemplification of one preferred embodiment thereof. Many other variations are possible. For example, overall dimensions or geometry may be modified to allow adaptation to other styles and kinds of seats; such as bench style car seats. Other materials having a waterproof, breathable backing or characteristic may be substituted for the middle and lower layers. Similarly, other materials with properties that improve comfort for the occupant, change the aesthetics, or improve durability may be substituted for the upper layer. Attachment of the upper layer material to the laminated central layer may be modified using a variety of stitch types, or waterproof, launderable adhesives. The drawcord and toggle closure may be relocated to modify the self-storing feature, or eliminated to reduce product cost. A multitude of aesthetic modifications are possible. For example, decorative patterns may be printed or embroidered directly to the seat cover materials. Additional features may be added to the seat cover to optionally allow more secure anchoring of the seat cover to the seat bottom or back.

Thus, the scope of the present invention should be determined by the appended claims and their legal equivalents, rather than by the examples given.

What is claimed is:

1. A reusable and machine-washable protective cover for a car seat of an automobile, said car seat of said automobile having a seat portion and a back portion, said protective cover comprising:

an upper layer having a seat portion on which a person's legs may be supported and a back portion against which a person's back may be disposed, said upper layer comprising means for wicking away moisture from a person and facilitating evaporation of accumulated moisture, said upper layer being reusable and machine-washable;

a middle layer of material attached to said upper layer, said middle layer of material being reusable and machine-washable; and a lower layer of material attached to said middle layer of material, said lower layer of material having a seat portion adapted to conform to said seat portion of said car seat of said automobile and a back portion adapted to conform to said back portion of said car seat of said automobile, said lower layer of material being reusable and machine-washable and being composed of a liquid-impermeable material, wherein said upper layer is composed of a mesh material.

2. A reusable and machine-washable protective cover for a car seat of an automobile, said car seat of said automobile having a seat portion and a back portion, said protective cover comprising:

an upper layer having a seat portion on which a person's legs may be supported and a back portion against which a person's back may be disposed, said upper layer comprising means for wicking away moisture from a person and facilitating evaporation of accumulated moisture, said upper layer being reusable and machine-washable;

a middle layer of material attached to said upper layer, said middle layer of material being reusable and machine-washable; and a lower layer of material attached to said middle layer of material, said lower layer of material having a seat portion adapted to conform to said seat portion of said car seat of said automobile and a back portion adapted to conform to said back portion of said car seat of said automobile, said lower layer of material being reusable and machine-washable and being composed of a liquid-impermeable material, wherein said upper layer is composed of a nylon mesh material.

3. A reusable and machine-washable protective cover for a car seat of an automobile, said car seat of said automobile having a seat portion and a back portion, said protective cover comprising:

an upper layer having a seat portion on which a person's legs may be supported and a back portion against which a person's back may be disposed, said upper layer comprising means for wicking away moisture from a person and facilitating evaporation of accumulated moisture, said upper layer being reusable and machine-washable and being composed of a mesh material;

a middle layer of material attached to said upper layer, said middle layer of material being reusable and machine-washable and being composed of nylon;

a lower layer of material attached to said middle layer of material, said lower layer of material having a seat portion adapted to conform to said seat portion of said car seat of said automobile and a back portion adapted to conform to said back portion of said car seat of said automobile, said lower layer of material being reusable and machine-washable, having a rubbery texture for gripping said car seat of said automobile, and being composed of a liquid-impermeable, gas-permeable material; and a pocket attached to one of said layers and being adapted to fit over a top portion of said car seat of said automobile, said pocket being sized to allow said upper, middle and lower layers to be removably disposed therein, said pocket being provided with closure means for closing said pocket when said upper, middle and lower layers are disposed therein.

4. A protective cover as defined in claim 3 wherein said upper layer is composed of a nylon mesh material.

5. A protective cover as defined in claim 3 wherein said upper layer is composed of a polyester fleece material.

6. A protective cover as defined in claim 3 wherein said upper layer is composed of terry cloth.

7. A protective cover as defined in claim 3 wherein said lower layer is composed of polyurethane.

8. A protective cover as defined in claim 3 wherein said closure means comprises a drawstring.

\* \* \* \* \*